United States Patent
Yamazaki et al.

(10) Patent No.: US 7,403,221 B2
(45) Date of Patent: Jul. 22, 2008

(54) COMMUNICATION DEVICE, IMAGE STORAGE DEVICE, IMAGE PICKUP DEVICE, AND CONTROL METHOD THEREOF

(75) Inventors: Shinichi Yamazaki, Kanagawa-ken (JP); Kenichi Fujii, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 489 days.

(21) Appl. No.: 10/533,140

(22) PCT Filed: Nov. 6, 2003

(86) PCT No.: PCT/JP03/14146

§ 371 (c)(1),
(2), (4) Date: Apr. 29, 2005

(87) PCT Pub. No.: WO2004/042611

PCT Pub. Date: May 21, 2004

(65) Prior Publication Data

US 2006/0025071 A1     Feb. 2, 2006

(30) Foreign Application Priority Data

Nov. 6, 2002  (JP) .............................. 2002-322637
Oct. 9, 2003  (JP) .............................. 2003-351371

(51) Int. Cl.
*H04N 5/232*    (2006.01)
(52) U.S. Cl. ................................. 348/211.2; 348/231.9
(58) Field of Classification Search .............. 348/211.2, 348/207.99, 207.1, 211.3, 211.14, 231.9; 455/556.1
See application file for complete search history.

(56) References Cited

U.S. PATENT DOCUMENTS 5,768,633 A * 6/1998 Allen et al. .................... 396/2

(Continued)

FOREIGN PATENT DOCUMENTS

EP      1003322 A2      5/2000

(Continued)

OTHER PUBLICATIONS

European Patent Office Search Report Communication dated Nov. 15, 2007.

*Primary Examiner*—Tuan Ho
*Assistant Examiner*—Amy Hsu
(74) *Attorney, Agent, or Firm*—Fitzpatrick, Cella, Harper & Scinto

(57) ABSTRACT

When a communication device sends an image pickup instruction signal to an image pickup device by remote control, positional information obtained by the communication device is also sent. Upon reception of the image pickup instruction signal, the image pickup device performs image pickup. When storing a taken image, the positional information received is stored in the header of the image. Moreover, when searching an image stored in the image pickup device from the communication device, the image pickup device informs the communication device of search conditions (time information, positional information, and keyword) added to the image and positional information attribute (GPS information, base station ID, and character data). The communication device performs search by using the search condition and the positional information attribute informed by the image pickup device.

11 Claims, 9 Drawing Sheets

U.S. PATENT DOCUMENTS

| | | | | |
|---|---|---|---|---|
| 6,337,951 B1 * | 1/2002 | Nakamura | | 396/57 |
| 6,396,537 B1 * | 5/2002 | Squilla et al. | | 348/239 |
| 7,123,935 B2 * | 10/2006 | Takahashi | | 455/556.1 |
| 7,265,779 B2 * | 9/2007 | Sato et al. | | 348/207.1 |
| 2001/0041056 A1 | 11/2001 | Tanaka et al. | | 386/95 |
| 2002/0059215 A1 | 5/2002 | Kotani et al. | | |

FOREIGN PATENT DOCUMENTS

| | | |
|---|---|---|
| JP | 8-77912 | 3/1996 |
| JP | 9-212518 | 8/1997 |
| JP | 2001-194721 | 7/2001 |
| JP | 2001-211364 | 8/2001 |
| JP | 2001-230999 | 8/2001 |
| JP | 2002-152637 | 5/2002 |
| JP | 2002-202978 | 7/2002 |
| KR | 2001-0083203 | 8/2001 |

* cited by examiner

RC1 : RADIO COMMUNICATION SYSTEM

2 : IMAGE PICK-UP APPARATUS

3 : MOBILE TERMINAL

COMMUNICATION DEVICE, IMAGE STORAGE DEVICE, IMAGE PICKUP DEVICE, AND CONTROL METHOD THEREOF

TECHNICAL FIELD

The present invention relates to a technique used when a communication device searches images stored in another device, and a technique of facilitating the search.

BACKGROUND ART

Recently, to facilitate creation of electronic albums and search of images, time information, positional information, and various conditions where an image was taken can be added to image data taken by an image pickup device.

Also, suggestions have been made for image search using such information added to image data, including information about the name of the place where the image was taken, the address of the place, the date and time, the person who took the image, and a keyword.

For example, Japanese Patent Application Laid-Open No. 2001-230999 discloses a technique in which a mobile phone displays filenames, thumbnails, properties, etc. of images stored in a digital camera so that a user can select a desired image, and the selected image is sent from the digital camera to the mobile phone.

Global Positioning System (GPS) information can be used for positional information for specifying, e.g., the name or address of the place where an image was taken.

For example, Japanese Patent Application Laid-Open No. 2001-211364 discloses a technique in which an image pickup device receives a GPS signal for positional measurements and the positioning information is sent to a server having a map information database. The server then converts the received positional information into map information and sends the map information back to the imagepickup device, and the image pickup device stores the map information received from the server in a header of the image data.

Not only GPS information but also base station ID numbers from public base stations in a mobile phone system, can be used for the positional information. Thus, various kinds of positioning information are used.

Accordingly, a user cannot know whether image data stored in an image pickup device is provided with GPS information or with base station ID numbers, so that he/she cannot judge which positional information is to be used when making an image search with positional information.

A user feels inconvenience also when searching not with positional information but with information of other kinds, because it is not known what kinds of search information are added to the image data stored in the image pickup device.

Also, though some portable terminals, like mobile phones, are equipped with a position measuring function using GPS or base station ID numbers, adding positional information about the image pickup location to an image taken by an image pickup device requires that the image pickup device be equipped with a position measuring function using GPS or base station ID numbers, or that the image pickup device obtain positioning information from another device having a position measuring function.

Equipping the image pickup device with a position measuring function prevents size reduction of the image pickup device.

Also, when obtaining positioning information from another device, the image pickup device requests the other device to send positioning information, and the other device receives the request, measures the position, and sends the result to the image pickup device, which requires establishment of connection just to obtain the positioning information.

DISCLOSURE OF THE INVENTION

An object of the present invention is to simplify the operation of searching image data and reduce the burden of a user.

Another object of the present invention is to enable a user to be informed of attributes of search conditions that are added to the image data to be searched.

Another object of the present invention is to enable easy search even when positional information of various attributes are added to images.

Another object of the present invention is to enhance efficiency in informing an image pickup device of positional information.

Other objects of the present invention will become apparent from the following description taken in conjunction with the accompanying drawings.

BEST MODE FOR CARRYING OUT THE INVENTION

First Embodiment

Figure 1:
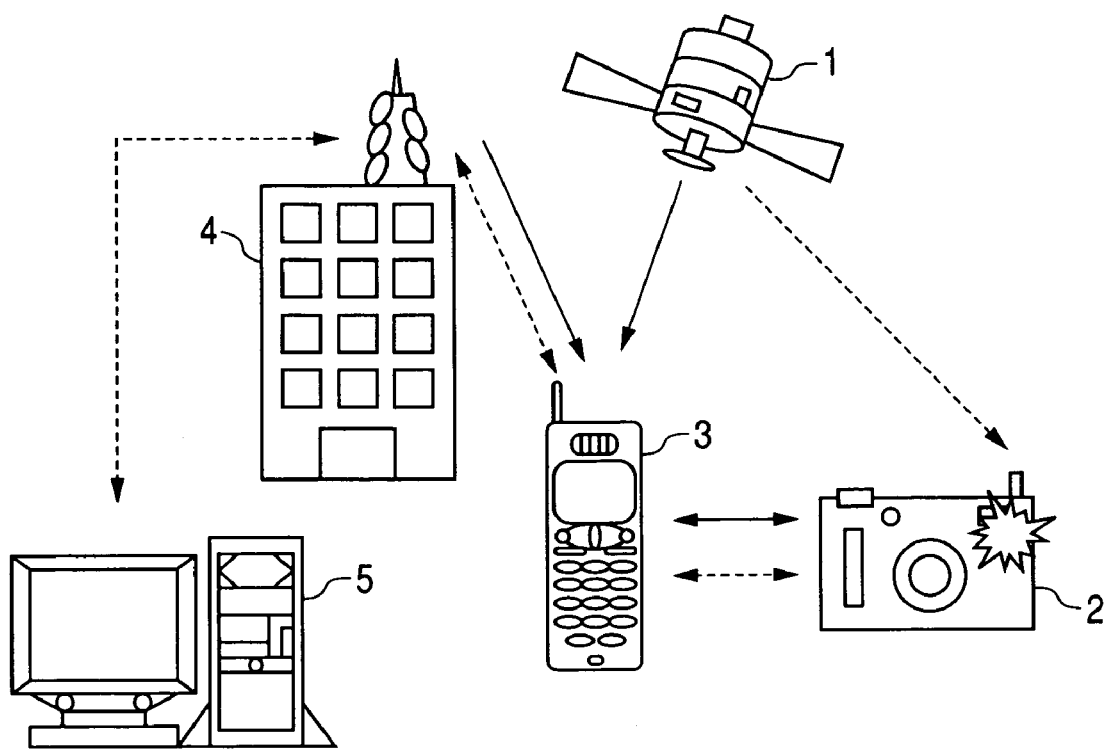
FIG. 1 is a diagram showing a radio communication system RC1 according to an embodiment of the present invention.

FIG. 1 is a diagram showing a radio communication system RC1 according to an embodiment of the present invention.

The radio communication system RC1 includes a plurality of GPS satellites 1 located at an altitude of about 20,000 Km in space, an image pickup device 2 such as a digital camera, a mobile terminal 3 such as a mobile phone connected by radio to the image pickup device 2 and remotely controlling the image pickup device 2, a server 5 having a positional information database provided on the Internet, and a plurality of relay stations (base stations) 4 connected to the server 5.

The mobile terminal 3 is capable of remotely controlling the image pickup device 2 to instruct the image pickup device 2 through a radio channel, e.g., to take an image. When the mobile terminal 3 sends a shutter release signal (image pickup instruction signal) to the image pickup device 2, the mobile terminal 3 obtains as positional information from the relay station 4 a base station ID to the place where the image is taken, or the mobile terminal 3 obtains GPS information as positional information from the GPS satellite 1. When the mobile terminal 3 provides an image pickup instruction by remote control, the mobile terminal 3 sends the positional information to the image pickup device 2 together with the shutter release signal. As the positional information, character data entered by a user may be sent. The mobile terminal 3 also has a function to search image data recorded in the image pickup device 2, and time information, positional information, and a keyword added to the image data can be used as search conditions for sending the image data.

Figure 2:
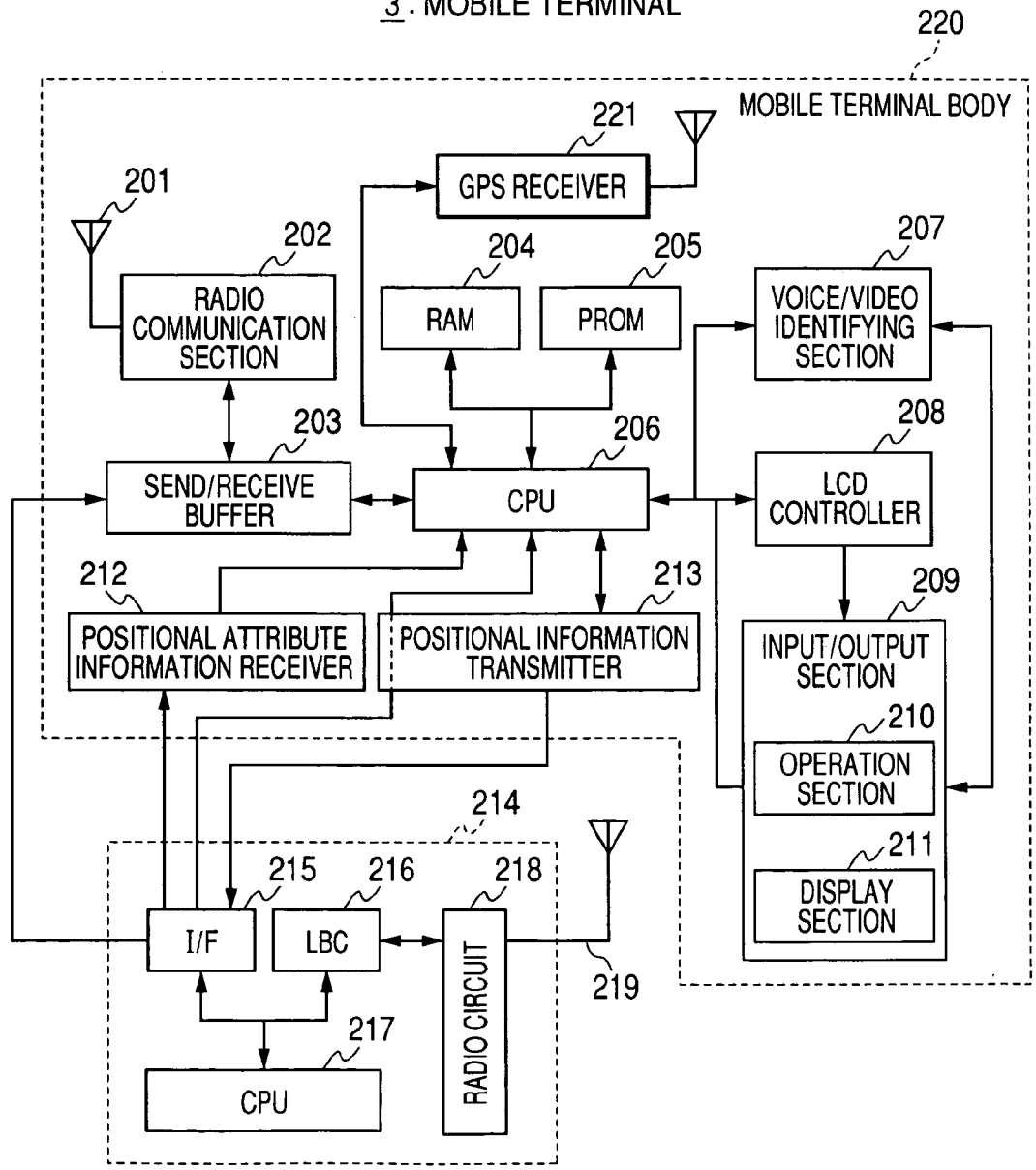
FIG. 2 is a block diagram showing an example of a mobile terminal 3 according to the embodiment of the present invention.

FIG. 2 is a block diagram showing an example of the mobile terminal 3 of the embodiment.

The mobile terminal 3 includes a Bluetooth radio section 214 and a mobile terminal body 220.

The Bluetooth radio section 214 includes a Bluetooth communication radio circuit 218 having a communication antenna 219, a CPU 217 for controlling the Bluetooth radio section 214, a link baseband controller (LBC) 216, and an external interface 215 serving as an interface with the mobile terminal body 220.

The radio circuit 218 performs digital modulation, spectral spreading, signal level amplification, etc. The CPU 217 and the LBC 216 have a function as a link manager performing radio link establishment, signal coding/decoding, etc.

The external interface 215 has a function as a host command interface (HCI).

The mobile terminal body 220 includes a public network antenna 201 for radio communication by a mobile telephone system, a radio communication section 202 for sending, to the mobile phone communication relay station 4, voice data or image data multiplexed according to a given format, a send/receive buffer 203 for temporarily storing send/receive data, a RAM 204 serving as a working area for processing by a CPU 206 that controls the entire functions, and a PROM 205 for storing programs for operating the CPU 206 and various kinds of data, such as addresses of destinations of communication.

The mobile terminal body 220 further includes a voice/video identifying section 207 for identifying multimedia information as voice data and image data, an LCD controller 208 for controlling an LCD, an input/output section 209 including an operation section 210 having a microphone, a speaker, a camera, key buttons, etc. and a display 211 for displaying an image controlled by the LCD controller 208, a positional attribute information receiver 212 for obtaining and storing attributes of positional information sent from another device, a positional information transmitter 213 for transmitting, when instructing image-taking, data including positional information received from the GPS satellite 1, the relay station 4, etc., and a GPS receiver 221 for receiving GPS information from the GPS satellite 1.

The mobile terminal 3 of the embodiment is equipped with a GPS receiver, but, in the absence of a GPS receiver, the positional information described below will include the base station ID of the relay station 4 or character data entered by a user.

When the mobile terminal 3 is equipped with the GPS receiver 221, the operation section 210 can be operated to select positional information to be sent to the image pickup device 2, from among positional information received by the GPS receiver 221, the base station ID received from the relay station 4, and character data (letter data etc.) entered through the operation section 210. If the GPS receiver 221 cannot receive GPS information when the mobile terminal 3 sends positional information, or if no base station ID can be received from the relay station 4, then any currently transmittable positional information is automatically sent independently of the selection, whereby positional information can be sent to the image pickup device 2 whenever possible.

The positional information sent to the image pickup device 2 may be one of the GPS information, base station ID, and character data, or may be two or all of them. This setting can also be made through operation of the operation section 210.

Figure 3:
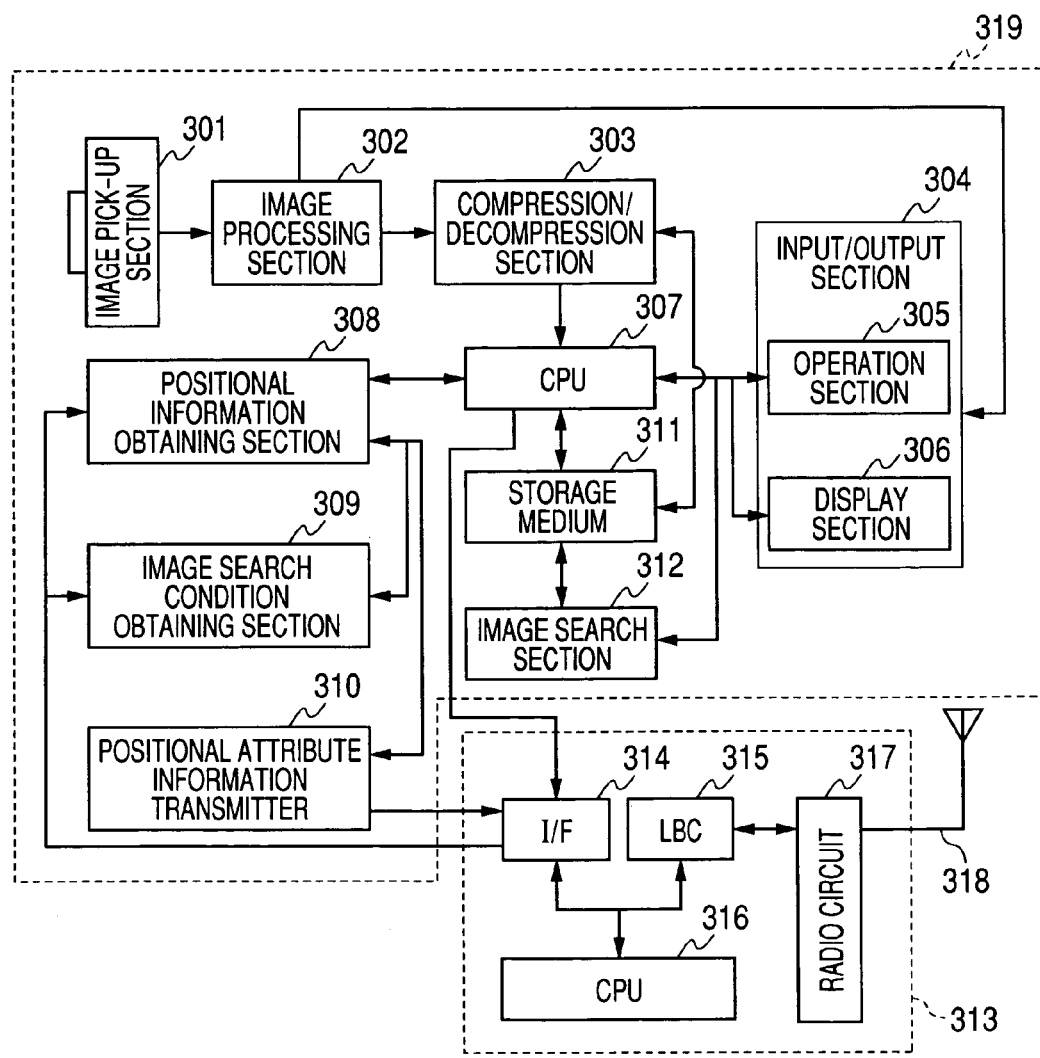
FIG. 3 is a block diagram showing an example of an image pickup device 2 according to the embodiment of the present invention.

FIG. 3 is a block diagram showing an example of the image pickup device 2 of the embodiment.

The image pickup device 2 includes a Bluetooth radio section 313 and an image pickup device body 319.

The Bluetooth radio section 313 has similar functions to those of the mobile terminal 3.

The image pickup device body 319 includes an image pickup section 301 for focusing an image of the target on a light receiving surface and performing photoelectric conversion, an image processor 302 for performing pixel-number conversion and various corrections including gamma correction, contrast correction, etc., a compression/decompression section 303 for providing compression control to compress image data by JPEG, MPEG, etc. according to the image pickup mode and providing expansion control (decompression) to display image data on a display 306, and the display 306 for displaying obtained image data.

The image pickup device body 319 further includes an input/output section 304 including an operation section 305 for shutter operation and various settings, a CPU 307 including a microcomputer mainly supervising control of an image pickup device, a positional information obtaining section 308 for obtaining positional information sent from the positional information transmitter 213 of the mobile terminal 3, an image search condition obtaining section 309 for obtaining conditions for image search, a positional attribute information transmitter 310 for transmitting attributes of positional information added to image data recorded in a storage medium 311, and an image search section 312 for searching images according to an image search condition.

Figure 4:
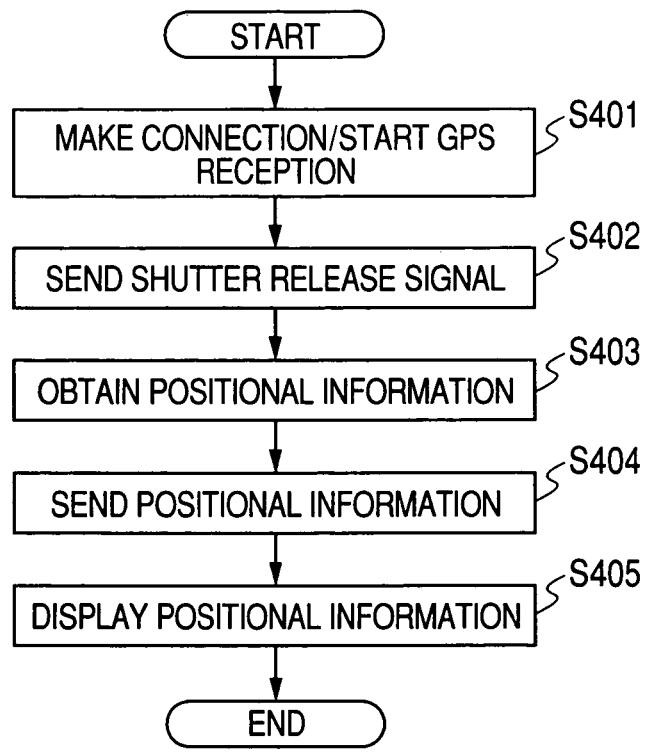
FIG. 4 is a flowchart of an operation of the embodiment in which the mobile terminal 3 sends a shutter release signal and positional information to the image pickup device 2.

FIG. 4 is a flowchart of an operation of the embodiment in which the mobile terminal 3 sends a shutter release signal and positional information to the image pickup device 2.

First, when a user operates the operation section 210 to set the mobile terminal 3 in a mode for remotely controlling the image pickup device 2, the GPS receiver 221 starts reception of GPS information from the GPS satellite 1 and a connection is made with the image pickup device 2 according to Bluetooth specification (S401).

Next, an image pickup button of the operation section 210 is depressed to send a shutter release signal to the image pickup device 2 from the Bluetooth antenna 219 of the mobile terminal 3 (S402). At the same time, positional information previously selected to be sent is obtained (S403) and sent to the image pickup device 2 through the positional information transmitter 213 and the Bluetooth antenna 219 (S404). That is to say, according to a setting on the operation section 210, one, or two, or all of the base station ID received from the relay station 4 through the public network antenna 201, the GPS information received from the GPS satellite 1 through the GPS receiver 221, and character data entered as positional information through operation of the operation section 210, are obtained and transmitted in response to the depression of the image pickup button.

Then, the display 211 displays the attribute or attributes of the transmitted positional information to let the user know the attribute(s) of the positional information that has been actually added to the image (S405). The display made in the step S405 shows whether the transmitted positional information includes the GPS information, base station ID, or character, or, in addition, also shows the actually transmitted latitude and longitude information, base station ID number, or character data.

Figure 8:
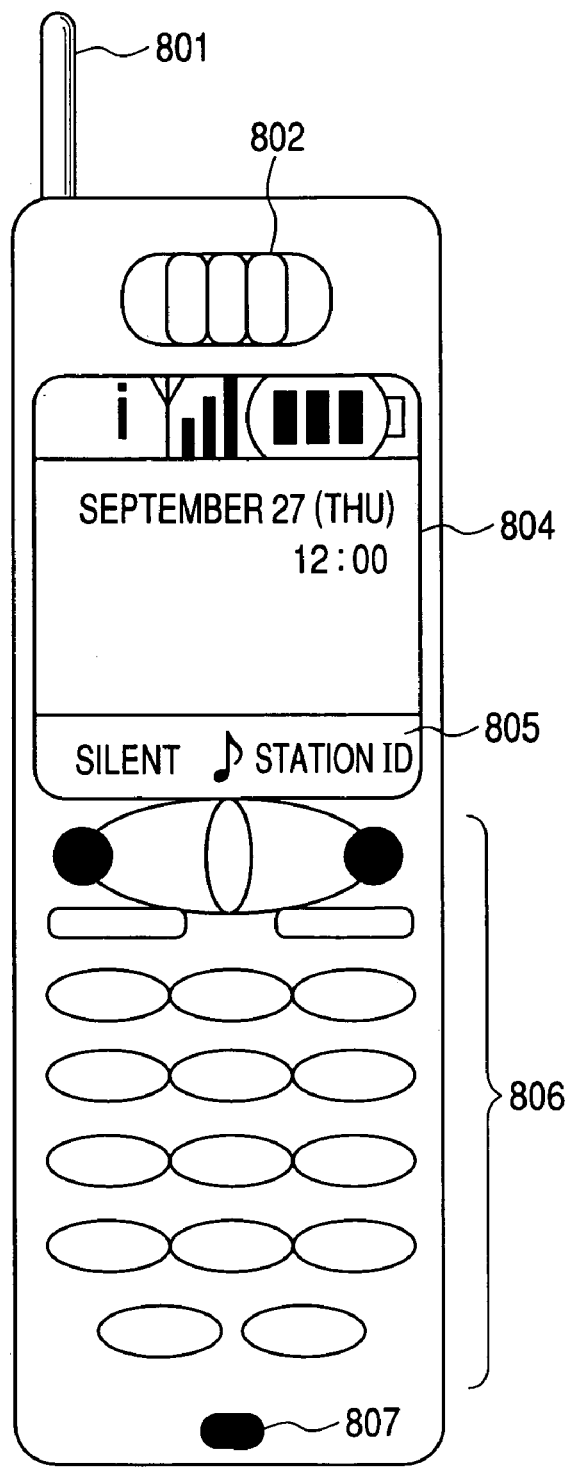
FIG. 8 is a diagram showing an example of a screen that a display 211 of the mobile terminal 3 of the embodiment displays when the mobile terminal 3 has obtained an attribute of positional information.

FIG. 8 is a diagram showing an example of a screen indicating an attribute of the transmitted positional information on the display 211 of the mobile terminal 3, which shows that the base station ID was sent as positional information.

The mobile terminal 3 is constructed in the form of a common mobile phone having an antenna 801 (201), a speaker 802, a display 804 (211), an operation section 806 (210), and a microphone 807, where the transmitted positional information attribute 805 is displayed at the bottom right of the screen. Needless to say, the positional information attribute 805 may be displayed at the top of the screen or at the bottom left.

The user checks the positional information attribute 805 to know the attribute of the positional information transmitted to the image pickup device 2.

When the transmitted positional information includes a plurality of attributes, that is, when a plurality of positional information attributes are available in image search, the attributes may be displayed together, or may be indicated to the user as "Station ID etc.", for example. Also, some mark, e.g. "x", may be displayed with positional information attributes that the mobile terminal 3 is set not to select for transmission, and with positional information attributes that the mobile terminal 3 failed to send due to an error. The attributes may be displayed on the screen only when an image search application is active, or may be always displayed on the screen.

Figure 5:
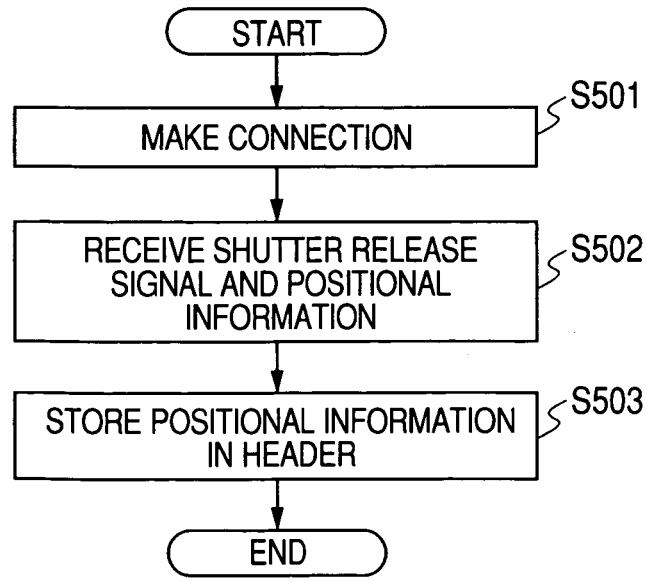
FIG. 5 is a flowchart of an operation of the embodiment in which the image pickup device 2 receives the shutter release signal and positional information from the mobile terminal 3.

FIG. 5 is a flowchart of an operation in which the image pickup device 2 receives the shutter release signal and positional information from the mobile terminal 3 in the embodiment.

The image pickup device 2 makes a connection with the target mobile terminal 3 according to the Bluetooth specification (S501). Then, the Bluetooth radio section 313 and the positional information obtaining section 308 of the image pickup device 2 receive the shutter release signal and positional information from the mobile terminal 3 (S502), and the image pickup section 301 takes an image. The received positional information is stored in the header of the taken image data as information about the image pickup location (S503) and held in the storage medium 311.

Next, according to the embodiment, an image search operation performed on the mobile terminal 3 side will be specifically described.

Figure 6:
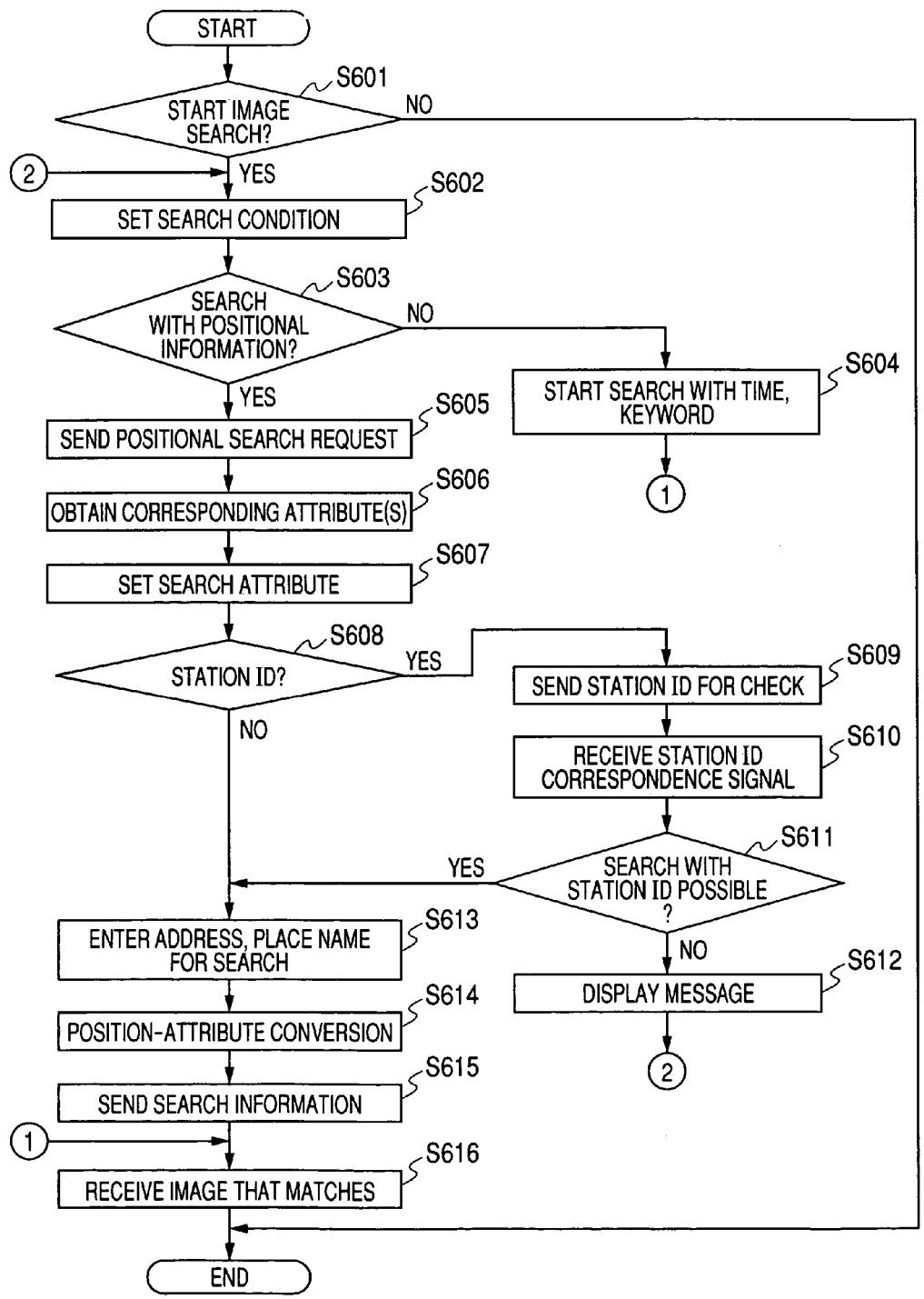
FIG. 6 is a flowchart of an operation of the embodiment that the mobile terminal 3 performs when the mobile terminal 3 searches for an image stored in the image pickup device.

FIG. 6 is a flowchart of an operation in which the mobile terminal 3 and the image pickup device 2 are connected by radio and the mobile terminal 3 searches for an image.

First, an image search program stored in the PROM 205 of the mobile terminal 3 is activated to start an image search (S601).

Figure 9:
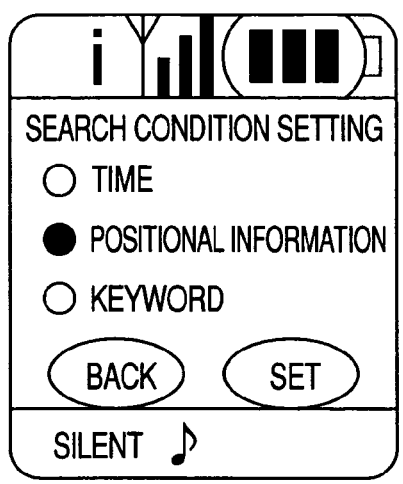
FIG. 9 is a diagram showing an example of a search condition setting screen that appears during a process in which the mobile terminal 3 searches images stored in the image pickup device according to the embodiment of the present invention.

Next, with the setting screen shown in FIG. 9, the operation section 210 is operated to select a desired search condition from among time information, positional information, and keyword, and then a determination button is depressed to set a search condition (S602).

The "time information" at least includes the date and time when the image was taken, and the "positional information" at least includes the latitude and longitude information based on GPS information, the base station ID sent from the relay station to the mobile terminal, an address represented by character data such as "Japan, Tokyo, Shibuya, 2-Δx1-3", and a place name represented by character data such as "Univers?l Stud?o Japan" or "Mt. Fuji".

The keyword is character data, such as "wedding" and "travel to Hawaii". Then, whether the search condition is the positional information or other information is checked (S603). When time or keyword is selected as the search condition, information for requesting a search based on the selected search condition, i.e., a command for requesting a search with time information or keyword and the time information or keyword used for the search, are transmitted to the image pickup device 2 to start the search (S604). Then, the retrieved image data is received from the image pickup device 2 (S616).

On the other hand, when it is judged that the positional information has been selected as a search condition (S603), a command for requesting a search based on positional information is sent to the device that the mobile terminal 3 is connected with (the image pickup device 2 herein) (S605).

When the image pickup device 2 receives the request for a search with positional information and finds that some image data having positional information is stored in the storage medium 311, the image pickup device 2 sends, to the mobile terminal 3, the attribute(s) of the positional information added to the image data stored therein. The mobile terminal 3 obtains the attribute(s) of the positional information from the image pickup device 2 through the Bluetooth radio section 214 and the positional attribute information receiver 212 (S606), and the positional attribute information is given to the CPU 206.

Figure 10:
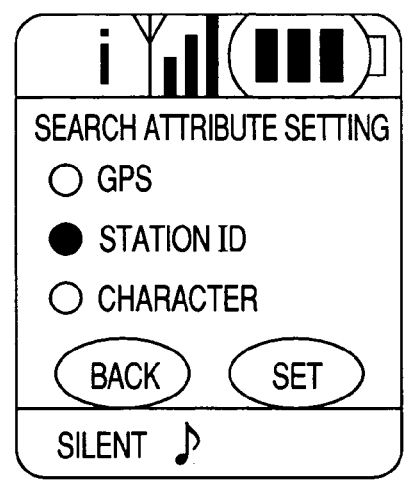
FIG. 10 is a diagram showing an example of a search attribute setting screen that appears during the process in which the mobile terminal 3 searches images stored in the image pickup device according to the embodiment of the present invention.

The CPU 206 gives the obtained positional attribute information to the image search program stored in the PROM 205 and also controls the display 211 of the input/output section 209 through the LCD controller 208 to display the obtained positional information attributes as shown in FIG. 10.

FIG. 10 shows an example in which all positional information attributes, including GPS, station ID, and character, have been obtained and displayed, but the display may not show positional attribute information not obtained, or the display may show obtained and not obtained positional information attributes in a distinguishable manner.

The "attribute" is "GPS" when GPS information is added to the image data, and the "attribute" is "station ID" when a base station ID covering the mobile terminal is added to the image data, and the "attribute" is "character" when character data representing an address or a place name is added to the image data.

Next, with the setting screen shown in FIG. 10, the operation section 210 of the mobile terminal 3 is operated to select a desired image search attribute from the obtained attribute information on the setting screen shown in FIG. 10, and the determination button is depressed to set the search attribute (S607).

Now, different mobile communication service companies may use different types of base station IDs, and so base station IDs of different companies may have different formats and indicate different areas, in which case the user's mobile terminal 3 may be unable to specify (send) a base station ID of some company as a search condition.

It is therefore necessary to check whether the base station IDs added to the headers of image data stored in the storage medium 311 of the image pickup device 2 are of the same type as the base station IDs that the mobile terminal 3 has.

Accordingly, when base station ID is an attribute used as a search condition (S608), the positional information transmitter 213 transmits a special base station ID as a check station ID (S609). The ID of the base station relating to the place where the user is performing the image search is sent as this base station ID.

When a station ID agreement signal is received from the connected image pickup device 2 (S610), the flow judges that base station IDs of the type that corresponds to the user's mobile terminal 3 are added to image data stored in the image pickup device 2 (S611) and the flow moves to step S613. On the other hand, when a message is received informing that there is no image data provided with base station IDs of the type that corresponds to the mobile terminal 3, the flow displays an error message to indicate that base station ID cannot be used for the search (S612), prompts the user to change the search condition, and returns to the step S602 for re-setting of the search condition.

The judgement in the step S611 may be achieved by adding identification information for identifying the mobile phone company servicing the mobile terminal 3, to the positional information sent with the shutter release signal when taking an image, and sending the identification information for identifying the mobile phone company in place of the check station ID sent in the step S609, with the identification information stored in the header as positional information. Alternatively, Bluetooth service discovery (SDP) may be performed to obtain company information about the station IDs added to the image data stored in the storage medium 311 of the image pickup device 2.

When a search condition other than base station ID is set in the step S607, or when the base station ID type that corresponds to the user's mobile terminal 3 can be used as a search condition, the operation section 210 of the mobile terminal 3 is operated to enter an address or place name for the search (S613).

Next, on the basis of the entered address or place name, a positional information to attribute conversion is performed using, e.g., an application stored in the PROM 205 of the mobile terminal 3 (S614). In the positional information to attribute conversion, the address or place name entered in the step S613 is converted to the selected positional information attribute. Then, the position-related information transmitter 213 transmits the attribute information as a search condition to the image pickup device 2 (S615).

For example, when "GPS" is selected as the search attribute in the step S607 and "Tokyo Tower" is entered in the step S613, then a conversion is performed to obtain latitude and longitude information about "Tokyo Tower" and the position-related information transmitter 213 transmits the latitude and longitude information to the image pickup device 2. When base station ID is selected, the ID of the base station that covers "Tokyo Tower" is obtained, e.g., from a base station ID map, and the position-related information transmitter 213 transmits the obtained base station ID. The positional information to attribute conversion may be executed by an application, or may be processed by hardware.

The mobile terminal 3 may be equipped with various databases containing latitude and longitude information, a base station ID map, etc., or information may be obtained from the server 5 through the relay station 4. The search information converted by the positional information to attribute conversion is sent to the connected image pickup device 2, and the image pickup device 2 performs a search according to the search condition, whereby a retrieved desired image is received from the image pickup device 2 (S616).

Next, a specific example of operation performed on the image pickup device side will be described.

Figure 7:
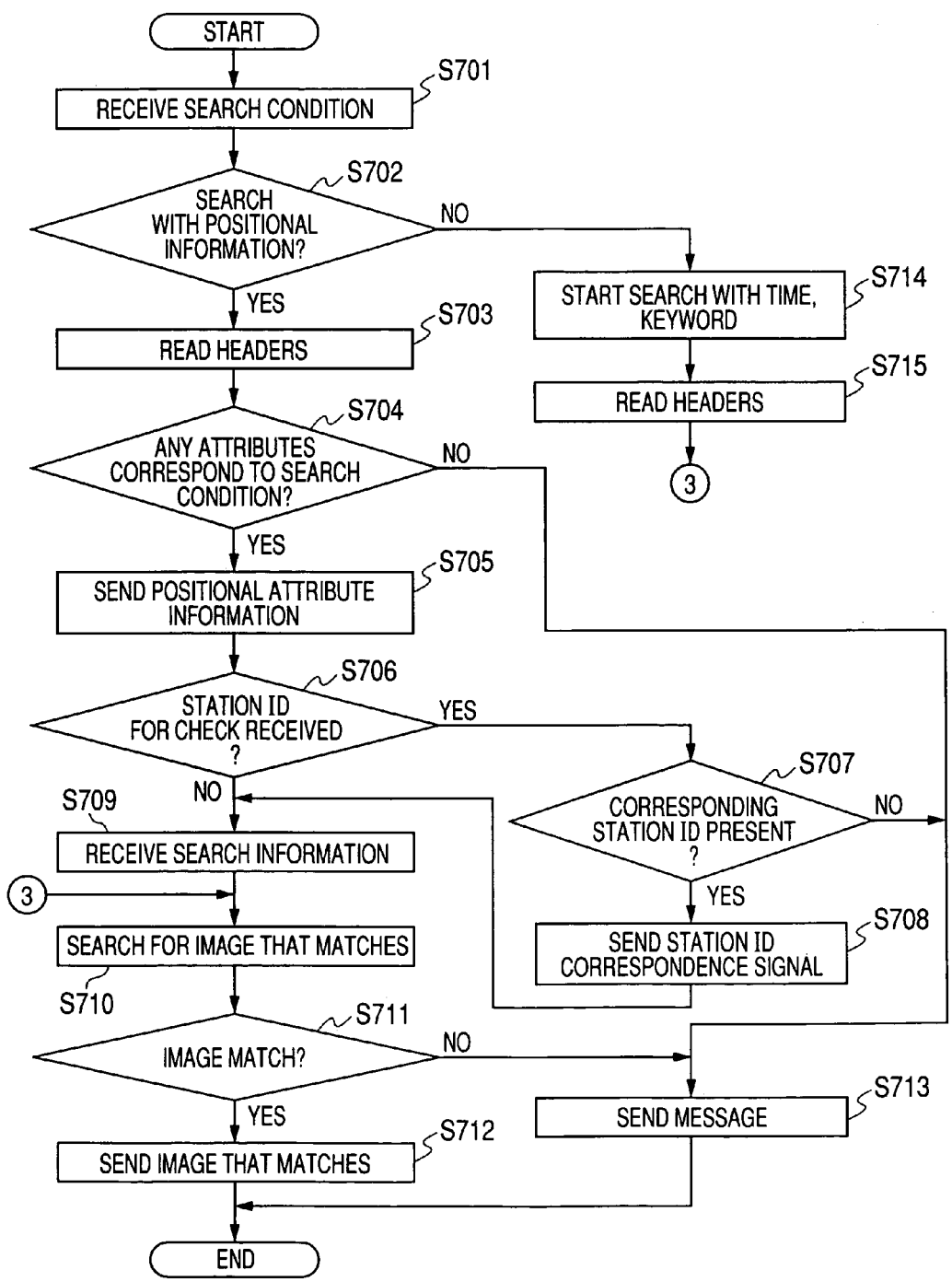
FIG. 7 is a flowchart of an operation of the embodiment that the image pickup device 2 performs when the mobile terminal 3 searches for an image stored in the image pickup device.

FIG. 7 is a flowchart of an operation of the embodiment in which the image pickup device 2 performs a search according to an instruction from the mobile terminal 3.

The image pickup device 2 is connected by radio with the mobile terminal 3 and receives a search request, and the image search condition obtaining section 309 receives, through the Bluetooth radio section 313, the search condition information that the mobile terminal 3 has selected in the step S602 and sent in the step S604 or S605 (S701). Then, the CPU 307 checks the received information to see whether the search is to be done with positional information or with time information or keyword (S702). When a search with positional information is being requested, the image search section 312 reads the attributes of positional information contained in the headers of image data stored in the storage medium 311 (S703).

When the search condition is "positional information", the attributes can be "GPS", "station ID", and "character" including address and place name. When the storage medium 311 contains image data provided with any of these attributes (S704), the positional attribute information transmitter 310 transmits the attribute(s) of the positional information added to the image data to the connected mobile terminal 3 through the Bluetooth radio section 313 (S705). For example, when the storage medium 311 contains image data provided only with GPS information as positional information, "GPS" is sent as the attribute information, and when the storage medium 311 contains image data with GPS information and image data with base station ID, or when the storage medium 311 contains a piece of image data with both of GPS information and base station ID, then "GPS" and "station ID" are transmitted as the attribute information. Needless to say, when there is image data provided with character data, like address or place name, "character" is transmitted as the attribute information.

When receiving a check station ID from the connected mobile terminal 3 (S706), the image search section 312 refers to the headers of the image data stored in the storage medium 311 to judge whether the stored base station IDs are of the same format (S707). Though the method of making the judgement depends on the application, the judgement may be made using differential information between station IDs, or the judgement may be made on the basis of some code for distinguishing station IDs of different companies.

When even one piece of image data is provided with a base station ID of the same format, a station ID agreement signal is sent to inform the presence of image data that is provided with a base station ID of the type that corresponds to the mobile terminal 3, whereby the connected mobile terminal 3 is informed that a search can be performed with a base station ID of that type (S708). On the other hand, in the absence of image data provided with the corresponding type of base station ID, a message is sent to prompt the user to change the search condition (S713). Though the data thus sent depends on the application, the data may be simply constructed so that 0 shows not handleable and 1 shows handleable.

On the other hand, when no check station ID is received, or when a station ID agreement signal is received in the step S708, then the search information that the mobile terminal has sent in the step S615 is received (S709), and the image search section 312 refers to the headers of the image data stored in the storage medium 311 and performs comparison and search to see whether any image data contains matching positional information (S710). When there is desired image data that matches the search condition (S711), that image data is sent to the mobile terminal 3 (S712). When no data matches, a message is sent to inform the user of no match (S713).

When the step S702 judges that the search is not to be done with positional information, i.e., when the search is to be done with time information or a keyword, the image search section 312 refers to the headers of the image data stored in the storage medium 311 (S714, S715) and performs comparison and search to see whether any image data matches the time information or keyword received from the mobile terminal 3 (S710). When there is desired image data that matches the search condition (S711), that image data is sent to the mobile terminal 3 (S712). When no data matches, a message is sent to inform the user of no match (S713).

The mobile terminal 3 of the embodiment has an automatic mode in which, even when the image search program is not active, positional attribute information is automatically obtained when a connection is made with a partner device.

Figure 13:
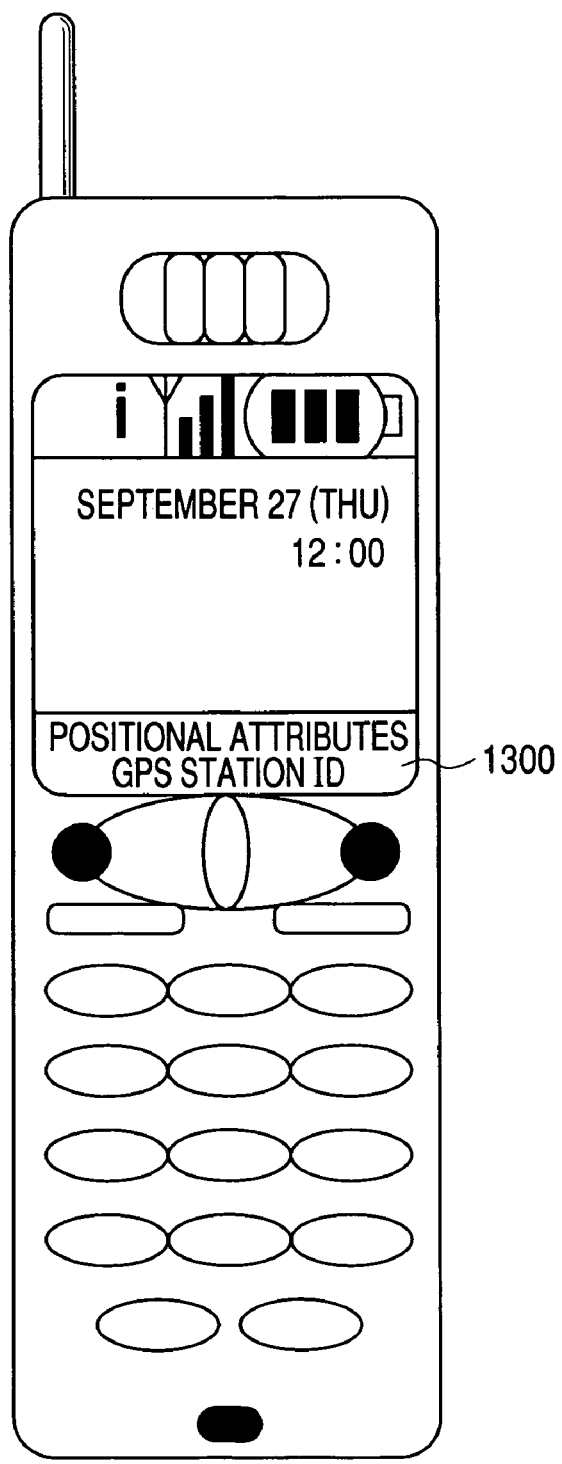
FIG. 13 is a diagram showing an example of a setting screen of the mobile terminal 3 that appears in the automatic mode in the embodiment of the present invention.

When the automatic mode is selected, as shown in FIG. 13, attributes 1300 of the positional information added to image data stored in the image pickup device 2 are displayed before the image search program is activated.

FIG. 13 shows an example in which the attributes of positional information added to image data stored in the image pickup device 2 include base station ID and GPS information.

Figure 12:
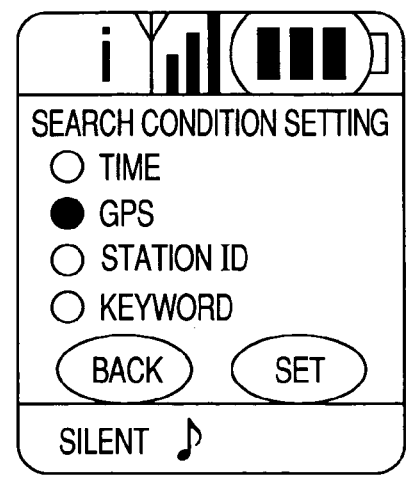
FIG. 12 is a diagram showing a search condition setting screen of the mobile terminal 3 that appears in an automatic mode in the embodiment of the present invention.

In the automatic mode, the attributes of positional information added to image data stored in the connected image pickup device 2 are already known when the image search application is activated, without the need to perform the steps S605 and 606 of FIG. 6. Accordingly, the search condition items, as shown in FIG. 9, can be displayed as more specific items, as shown in FIG. 12, on the basis of the positional information contained in image data stored in the image pickup device 2, which reduces the steps for specifying a search condition.

Also, a lock mode is provided in which, when the mobile terminal 3 is connected to another image pickup device, the positional information attribute selected last time is kept unchanged. That is, regularly used image pickup devices will all store image data provided with same kinds of positional information and so the lock mode removes the need to inquire of the image pickup device about positional information attributes each time the mobile terminal 3 is connected to an image pickup device, which shortens the time required for preparation of a search.

Figure 11:
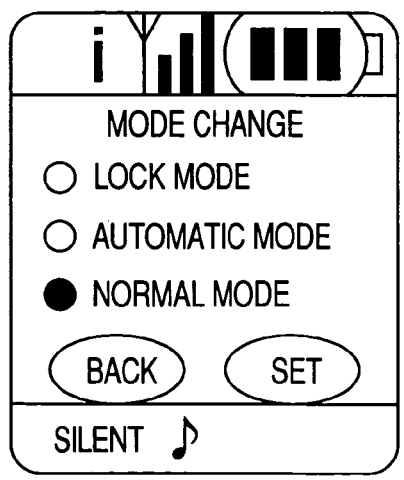
FIG. 11 is a diagram illustrating a screen for selecting a mode of the mobile terminal 3 of the embodiment of the present invention.

FIG. 11 is a diagram illustrating a screen for setting of various modes in the embodiment.

The operation section 210 is operated to select a desired mode and the determination button is depressed to change the mode.

Second Embodiment

In a second embodiment of the present invention, the mobile terminal 3 has an image pickup device function, and the mobile terminal having the image pickup device function is equipped with the function of the image pickup device described in the first embodiment, and an image pickup device or another mobile terminal is equipped with the function of the mobile terminal described in the first embodiment.

In the description above, in response to a request from the mobile terminal 3 for a search based on positional information, the image pickup device 2 informs the mobile terminal 3 of the attributes of positional information added to image data stored therein. However, in response to a search request from the mobile terminal 3, the image pickup device 2 may inform the mobile terminal 3 of the types of search conditions added to the stored image data (time information, keyword, and positional information). This shows, for example, whether there is image data provided with a keyword, or whether there is image data provided with positional information, which avoids selection of an unusable search condition.

As described above, the present invention simplifies the operation of searching image data and reduces the burden of the user.

Also, the searching side, and hence its user, can be informed which search conditions and attributes are added to the searched image data, which makes it possible to efficiently set a search condition.

Also, when positional information is selected as a search condition, the searching side, and hence its user, can be informed which attributes of positional information are added to the image data, which makes it possible to efficiently set a search condition when positional information is used for the search.

It is also possible to efficiently inform the image pickup device of the positional information.

The invention claimed is:

1. A communication apparatus, comprising:
    a recognizing device for recognizing at least an attribute of positional information that is added to image data stored in a communicating party;
    a searching device for searching the image data stored in the communicating party based on the recognized attribute of the positional information made by the recognizing device;
    a selecting device for selecting a desired one of a plurality of attributes recognized by the recognizing device; and
    a judging device for judging whether or not a form of the attribute of the positional information selected by the selecting device is utilizable in the communication apparatus to search by said searching device.

2. A communication apparatus according to claim 1, wherein the judging device makes the judgement based on positional information that is added to the image data stored in the communicating party.

3. A communication apparatus according to claim 1, further comprising a display device for displaying the attribute of the positional information recognized by the recognizing device.

4. A communication apparatus according to claim 1, further comprising an inquiry device for making an inquiry to the communicating party as to what attribute of a search condition is added to the image data stored in the communicating party, wherein the recognizing device makes the recognition based on a result of the inquiry made by the inquiry device.

5. A communication apparatus according to claim 4, wherein the inquiry device makes the inquiry each time the communication apparatus connects with the communicating party in order to search the image data stored in the communicating party.

6. A communication apparatus according to claim 4, further comprising a setting device for setting a mode in which the inquiry device does not make the inquiry even when the communication apparatus connects with the communicating party in order to search the image data stored in the communicating party.

7. A communication apparatus according to claim 4, further comprising a setting device for setting a mode in which the inquiry device makes the inquiry when the communication apparatus connects with the communicating party, independently of the search of the image data stored in the communicating party.

8. A communication apparatus according to claim 1, wherein the searching device comprises a converting device for converting the positional information to a given search condition in accordance with the attribute of the positional information recognized by the recognizing device, and an informing device for informing the communicating party of the search condition converted by the converting device.

9. A communication apparatus according to claim 8, wherein the converting device converts the positional information to the given search condition in accordance with the attribute of the positional information selected by the selecting device.

10. A communication apparatus controlling method, comprising:
    a recognizing step of recognizing at least an attribute of positional information that is added to image data stored in a communicating party;
    a searching step of searching the image data stored in the communicating party based on the recognized attribute of the positional information made in the recognizing step;
    a selecting step of selecting a desired one of a plurality of attributes recognized in the recognizing step; and
    a judging step of judging whether or not a form of the attribute of the positional information selected in the selecting step is utilizable in the communication apparatus to search by said searching step.

11. A computer-executable program stored on a computer-readable storage medium for controlling a communication apparatus, comprising:
    a recognizing step of recognizing at least an attribute of positional information that is added to image data stored in a communicating party;
    a searching step of searching the image data stored in the communicating party based on the recognized attribute of the positional information made in the recognizing step;
    a selecting step of selecting a desired one of a plurality of attributes recognized in the recognizing step; and
    a judging step of judging whether or not a form of the attribute of the positional information selected in the selecting step is utilizable in the communication device to search by said searching step.

* * * * *